United States Patent [19]
Tanaka et al.

[11] Patent Number: 5,831,180
[45] Date of Patent: Nov. 3, 1998

[54] TORQUE SENSING AND STRAIN DETECTING DEVICE

[75] Inventors: Katsufumi Tanaka; Yasuharu Odachi; Yoichiro Kashiwagi, all of Kariya, Japan

[73] Assignee: Kabushiki Kaisha Toyoda Jidoshokki Seisakusho, Kariya, Japan

[21] Appl. No.: 599,791

[22] Filed: Feb. 12, 1996

[30] Foreign Application Priority Data

Feb. 13, 1995 [JP] Japan ................................ 7-024386
May 25, 1995 [JP] Japan ................................ 7-126806

[51] Int. Cl.⁶ ........................................................ G01L 3/10
[52] U.S. Cl. ........................................ 73/862.333; 73/779
[58] Field of Search ....................... 73/862.331, 862.333, 73/862.334, 862.335, 779

[56] References Cited

U.S. PATENT DOCUMENTS

| | | |
|---|---|---|
| 2,873,584 | 2/1959 | Claudy . |
| 3,469,440 | 9/1969 | Lofgren ................................ 73/779 |
| 4,088,013 | 5/1978 | Dahle et al. ........................... 73/779 |
| 4,823,617 | 4/1989 | Hase et al. ........................ 73/862.335 |
| 4,962,672 | 10/1990 | Yagi et al. ........................ 73/862.335 |
| 5,255,567 | 10/1993 | Miyake et al. .................... 73/862.335 |
| 5,307,691 | 5/1994 | Miyake et al. .................... 73/862.335 |
| 5,321,985 | 6/1994 | Kashiwagi et al. ................... 73/862 |
| 5,353,649 | 10/1994 | Hase et al. ........................ 73/862.335 |

FOREIGN PATENT DOCUMENTS

| | | |
|---|---|---|
| 1245167 | 7/1967 | Germany . |
| 2451924 | 5/1975 | Germany . |
| 3212946 | 11/1983 | Germany . |
| 4011766 | 10/1990 | Germany . |
| 4309413 | 9/1994 | Germany . |
| 59-77326 | 5/1984 | Japan . |
| 61-162726 | 7/1986 | Japan . |
| 62-161033 | 7/1987 | Japan . |
| 63-317731 | 12/1988 | Japan . |
| 321747 | 3/1991 | Japan . |

*Primary Examiner*—Ronald L. Biegel
*Attorney, Agent, or Firm*—Brooks Haidt Haffner and Delahunty

[57] ABSTRACT

A torque sensing and strain detecting device that detects torque applied to a rotary shaft is described. The torque sensing and strain detecting device including a core made of a magnetostrictive material and at least two fastening sections fixed to the rotary shaft. A coil is wound around the core between the fastening sections. When torque is applied to the shaft, electromotive force is induced in the coil according to the strain produced in the core. Torque is detected based on the induced electromotive force.

18 Claims, 7 Drawing Sheets

TORQUE SENSING AND STRAIN DETECTING DEVICE

BACKGROUND OF THE INVENTION

1. Field of the Invention

The present invention relates to a torque sensing and strain detecting device that senses the torque applied to a rotary shaft by detecting a strain generated in the rotary shaft.

2. Description of the Related Art

Typical torque sensors which detect torque applied to a rotary shaft are proposed in Japanese Unexamined Patent Publication No. 59-77326, Japanese Unexamined Patent Publication No. 61-162726, and Japanese Utility Model Publication No. 3-21747.

The torque sensor disclosed in the Publication No. 59-77326 utilizes the magnetostriction effect. A magnetostrictive film made of an iron based amorphous material is provided on the peripheral surface of a rotary shaft. Slits extending in an inclined direction are formed in the film. An exciting coil and a detection coil are provided on the outer periphery of the rotary shaft. A yoke is mounted on the outer periphery of both coils. A space is defined between the two ends of the yoke and the film on the rotary shaft.

When the exciting coil is excited, a magnetic circuit is formed between the magnetostrictive film, the space, the yoke, the space and the magnetostrictive film. When a force in the circumferential direction of the rotary shaft is applied, permeability of the magnetostrictive film is altered according to the strength of the force. This, in turn alters the magnetic flux density. Alteration of the flux density changes the value of the induced electromotive force derived from the detecting sensor. The induced electromotive force from tthe detecting coil is rectified and converted into a direct current voltage. Detection of the torque applied on the rotary shaft is based on this voltage. In this disclosure, the slits of the film, extending along inclined angles, also enable the direction of the force, i.e., the front or rear directions, to be distinguished.

In another example described in this disclosure, a pair of magnetostrictive films, which have slits extending in opposite directions, is provided on the rotary shaft. An exciting coil, a detecting coil, and a yoke are arranged with each film. By transmitting the induced electromotive force from the two detecting coils to a differential amplifier, the torque is detected without being affected by external factors such as temperature.

The torque sensor (stress detecting sensor) described in the Publication No. 61-162726 is provided with an exciting core and a detection core. Both cores are U-shaped and have a bridge which connects a pair of arms. The bridge of the exciting core is wound by an exciting coil and arranged parallel to a rotary shaft. The bridge of the detection core is wound by a detection coil and arranged along a direction perpendicular to the rotary shaft. This sensor obtains induced electromotive force from the detection sensor according to the value of the torque applied to the shaft when a magnetic circuit is formed between the exciting core and the shaft, and another magnetic circuit is formed between the detection core and the shaft.

The torque sensor disclosed in the Publication No. 3-21747 is a strain gauge comprising semiconductor devices. A pair of cylinders are fitted on a rotary shaft with a space defined between each other. A strain gauge is adhered to a connecting plate which connects the two cylinders. The torque applied to the shaft is amplified by the plate and then detected by the strain gauge.

However, the torque sensor of the Publication No. 59-77326 requires a yoke in addition to the magnetostrictive film, the exciting coil and the detection coil. This adds to the number of components and causes an increase in manufacturing coat and assembling steps. Such conditions may reduce efficiency in management of the components. Furthermore, the accuracy required when assembling the large number of components, e.g., the exciting coil, detection coil and yoke, causes the assembling process to be burdensome.

Also, when assembling the torque sensor with the rotary shaft, which is the subject of torque detection, other components located near the shaft may interfere with the assembling. In such cases, it is necessary to prepare another rotary shaft with the exciting coil, detection coil and yoke assembled thereto in addition to the shaft which is the detecting subject. This will further increase costs and enlarge the size of the entire apparatus.

Furthermore, this torque sensor has a space defined between the yoke and the magnetostrictive film. This space degrades sensitivity and may result in a decrease in the value of the signal-to-noise ratio (S/N).

The torque sensor of the Publication No. 61-162726 also has a space which may cause a decrease in the S/N value. Additionally, two types of cores, i.e., the exciting core and the detection core, are required. This increases the number of components, causes an increase in cost, adds to the number of assembling steps and reduces component management efficiency.

The torque sensor, consisting of the strain gauge of the Publication No. 3-21747, does not have many components. However, adhering of the strain gauge to the connecting plate requires special high-grade techniques and causes the assembling to be burdensome.

SUMMARY OF THE INVENTION

Accordingly, it is a primary objective of the present invention to provide a torque sensing and strain detecting device that has a small number of components, may easily be assembled, has a small size and is capable of detecting torque with high sensitivity.

It is another objective of the present invention to provide a strain detecting device that has a small number of components and enables detection of strain with high accuracy.

To achieve the above objectives, a torque sensing and strain detecting device according to the present invention includes a core made of a magnetostrictive material with at least two fastening sections for the mounting of the core on a rotary shaft. A coil is wound around the core between the fastening sections. Torque is detectable in response to an electromotive force induced in the coil according to strain caused on the core when torque is applied to the rotary shaft.

The present invention also includes a strain detecting device having a core for detecting strain on a mechanical element. The device has at least a pair of fastening sections for mounting the core on the element. A coil is wound around the core between the fastening sections. Torque is detectable in response to an electromotive force induced in the coil according to strain caused on the core when torque is applied to the element. The core has a magnetostriction effect.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
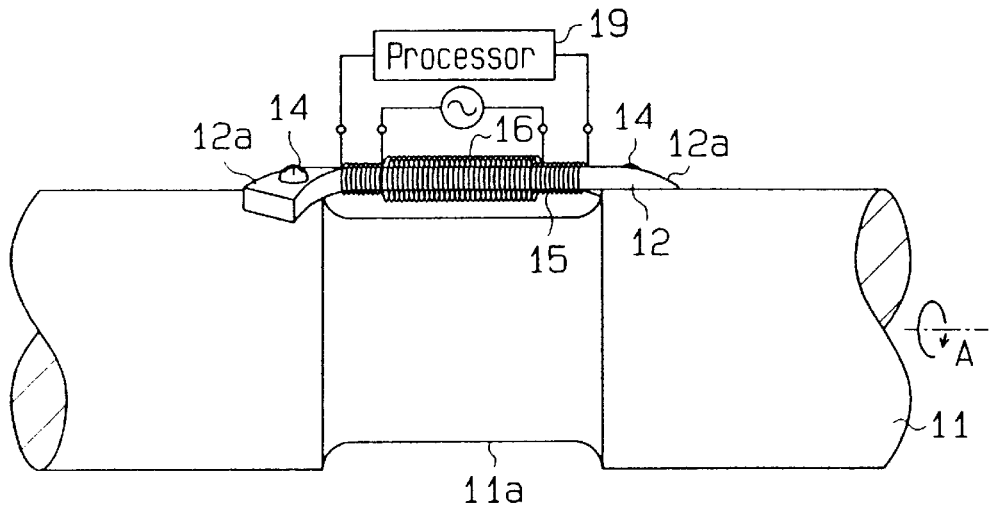
FIG. 1 is a front view showing a torque sensing and strain detecting device according to the present invention.
Figure 2:
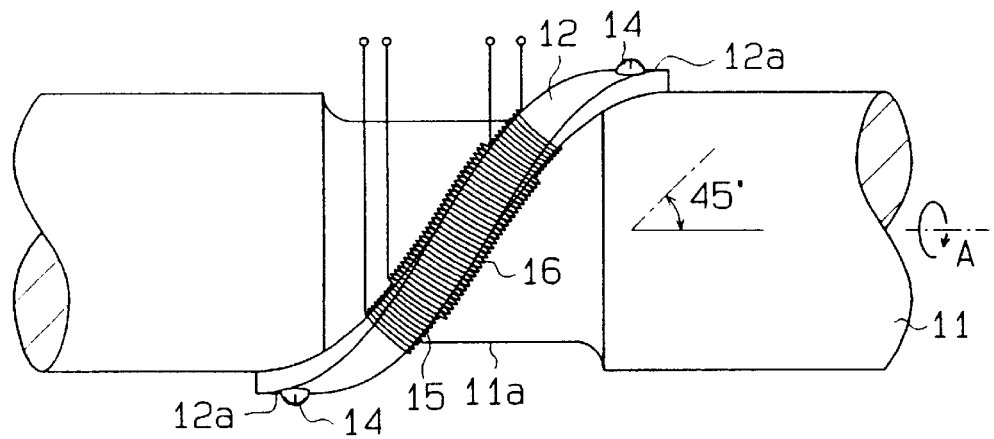
FIG. 2 is a plan view showing the torque sensing and strain detecting device of FIG. 1.
Figure 3:
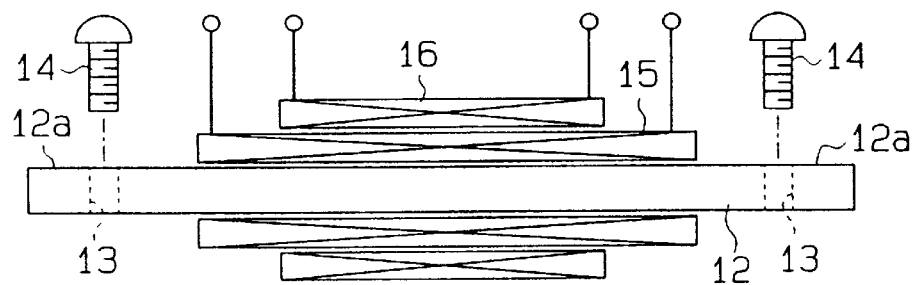
FIG. 3 is a diagrammatic view showing the torque sensing and strain detecting device of FIG. 1.

A torque sensing and strain detecting device according to the present invention will now be described with reference to the FIGS. 1 through 3. The torque sensing and strain detecting device is utilized in a vehicle power steering apparatus to detect the steering force, applied on a steering wheel by the vehicle's drive, from the torque applied on a steering shaft. FIGS. 1, 2, and 3 are front, plan and diagrammatic views, respectively, of the torque sensing and strain detecting device.

A steering shaft 11, which is a rotary shaft, has a groove 11a defined on its peripheral surface. A plate-shaped core 12 is arranged on the shaft 11 extending over the groove 11a. As shown in FIG. 2, the elongated core 12 is aligned in the direction of its elongation in a direction angularly disposed 45 degrees with respect to the axis of the shaft 11. A fastening section 12a is defined at each end of the core 12 in spaced apart relation to each other. Holes 13 extend through the plate 12 in the fastening sections 12a. The lower surface of the core 12 is curved along the peripheral surface of the shaft 11. A screw 14 is inserted into each hole 13 and fastened to the shaft 11 to fix the core 12 to the shaft 11 with the lower surface of the fastening sections 12a in contact with the shaft 11.

The core 12 is made from a magnetostrictive material having a magnetostriction effect, such as permalloy, iron-nickel-chromium alloy or Fe-Ni-Cr-Ti alloy. An iron-aluminum based magnetostrictive material or an amorphous magnetostrictive material may also be used for the core 12. The core 12 may be made of a material which is not magnetostrictive by providing a magnetostrictive film on its surface instead. When tensile force is applied to the core 12, the magnetic characteristic, or permeability of the core 12, is altered. Thus, when torque is applied to the right side of the shaft 11 in the direction indicated by arrow A as shown in FIG. 2, tensile force acts on the core 12 and thus causes strain. Contrarily, when torque is applied to the right side of the shaft 11, in the direction opposite to the arrow A, a compressive force acts on the core 12 and thus causes strain. The permeability of the core 12 is altered according to the strength of the tensile force and the compressive force. In the present invention, the stronger, the tensile force is, the larger the value of the permeability becomes, and the stronger the compressive force is, the smaller the permeability becomes. The strain in the direction of the tensile force is represented by $\in$ and the strain in the direction of the compressive force is represented by $-\in$.

A detection coil 15 is wound annularly around and along the core 12 between the two fastening sections 12a. An exciting coil 16 is wound around the detection coil 15. As seen in FIG. 1, neither the core 12 nor either of the detection and exciting coils 15 or 16 contacts the rotary shaft 11. The number of windings Na for the detection coil 15 is set greater than the number of windings Nb for the exciting coil 16. An alternating current having a certain amplitude and frequency is applied to the input terminal of the exciting coil 16. The current produces a magnetic circuit between the core 12, the shaft 11 and the core 12. An induced electromotive force Vout exists between the output terminals of the detection coil 15 wound around the core 12.

The induced electromotive force Vout is expressed by the following equation:

$$Vout = k \cdot Na \cdot \phi \cdot \in + Vo$$

In this equation, k represents a proportion constant determined by the shape of the core 11, Na represents the number of windings of the detection coil 15, $\phi$ represents the magnetic flux $\in$ represents strain, and Vo represents the induced electromotive force when the value of the strain is zero.

Strain $\in$ is expressed by the following equation:

$$\in = ko \cdot T$$

In this equation, ko represents a proportion constant determined by the shape of the core 11 and T represents the torque applied to the right side of the shaft 11 in a direction indicated by arrow A. The torque applied in the opposite direction of the arrow A is a negative value.

Flux $\phi$ is expressed by the following equation:

$$\phi = Nb \cdot I/R$$

In this equation, Nb represents the number of windings of the exciting coil 16, I represents the value of the electric current flowing through the exciting coil 16 and R represents the magnetic reluctance of the core 12.

From the above equation, it is apparent that the induced electromotive force Vout derived from the detection coil 15 is proportional to the strain $\in$ applied to the core 12, or the torque T applied toward the peripheral direction of the shaft 11.

In other words, as shown in FIG. 2, when a torque is applied to the right side of the shaft 11 in the direction indicated by the arrow A shown in FIG. 2, tensile force acts on the core 12 and causes strain. The strain is proportional to the value of the torque. Accordingly, the value of the induced electromotive force Vout derived from the detection coil 15 becomes large when the tensile force is applied.

On the other hand, when torque is applied to the right side of the shaft 11 in the direction opposite to the arrow A, a compressive force acts on the core 12 and causes strain. The strain is inversely proportional to the value of the torque. Accordingly, the value of the induced electromotive force becomes small when the compressive force is applied.

Figure 17:
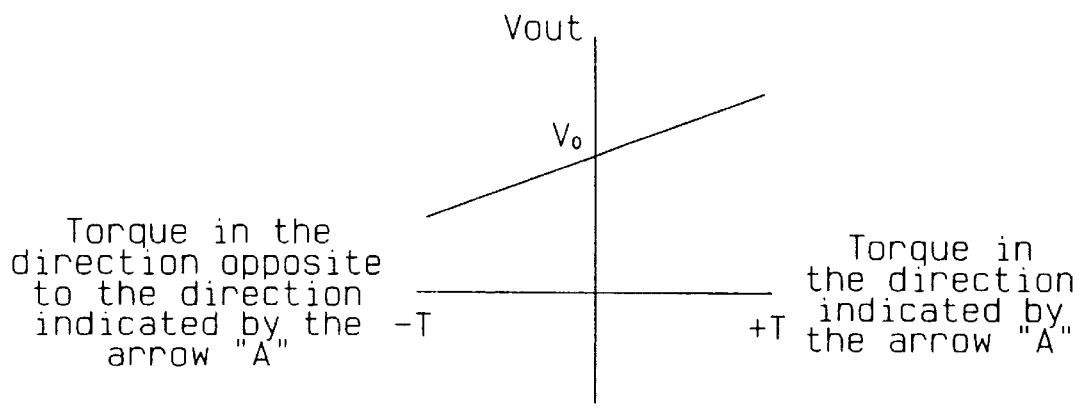
FIGS. 17 and 18 are graphs showing the relationship between the induced electromotive force of the torque sensing and strain detecting device and the applied torque.

The induced electromotive force Vout is conveyed to a conventional processor 19 and rectified in a rectifying circuit to calculate the value of the torque. The output characteristic of the induced electromotive force Vout with respect to torque T is shown in FIG. 17. The unit of the induced electromotive force Vout, indicated along the vertical axis of the diagram, is a direct current voltage value measured after the current is rectified in the rectifying circuit.

In this embodiment, the core 12, wound by the detection coil 15 and the exciting coil 16, is adhesively fixed to the shaft 11 at the lower surfaces of its fastening sections 12a. Thus, by exciting the exciting coil 16, a magnetic circuit is formed between the core 12, the shaft 11 and the core 12, substantially without any space. This structure differs from the prior art torque sensors. Consequently, the torque sensing and strain detecting device of the present invention prevents a reduction in sensitivity and suppresses a decrease of the S/N value.

The torque sensing and strain detecting device of the present invention comprises the plate-shaped magnetostrictive core 12, the detection coil 15 and exciting coil 16 wound around the core 12 and the fastening sections 12a defined at both ends of the core 12. Thus, the structure of the sensor is simple and the number of components are small compared to the prior art sensors. This enables the torque sensing and strain detecting device to be manufactured having a compact size and also simplifies management of the components.

The core 12, wound by the detection coil 15 and the exciting coil 16, is fastened to the shaft 11 with only the screws 14 and may be mounted directly on the shaft 11.

The core 12 will not easily loosen since the screws 14 are used to fastened the core 12. In addition, detection of the torque in both forward and reverse directions is ensured by the core 12, which is aligned along a direction inclined or angularly disposed at an angle of 45 degrees with respect to the longitudinal axis of the shaft 11.

Furthermore, the core 12 is secured to the shaft 11 extending over the groove 11a. This allows a portion of the coils 15, 16 to be arranged within the groove 11a. Therefore, the core 12 may be fixed to the shaft 11 with minimized interference between the shaft 11 and the coils 15, 16.

Although only one embodiment of the present invention has been described herein, it should be apparent to those skilled in the art that the present invention may be embodied in many other specific forms without departing from the spirit or scope of the invention. Particularly, it should be understood that the present invention may also be modified as described below.

Figure 4A:
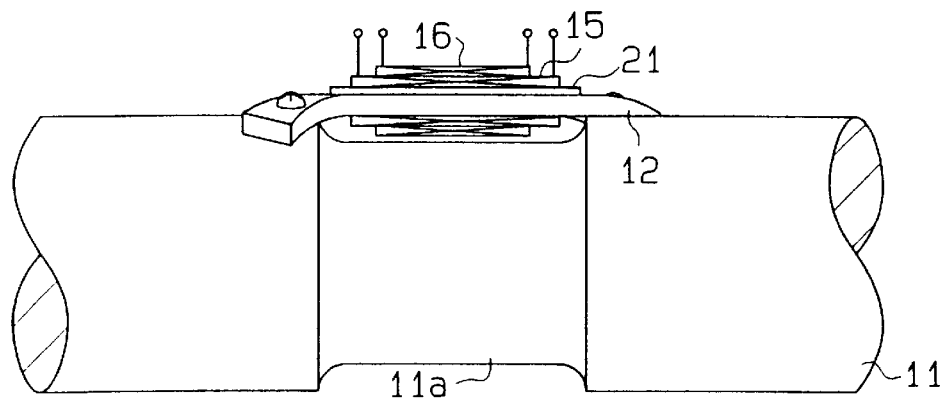
FIG. 4 (a) is a front view showing a modification of the torque sensing and strain detecting device, and FIG. 4 (b) is a diagrammatic view showing the direction of the strain applied to a core.
Figure 4B:
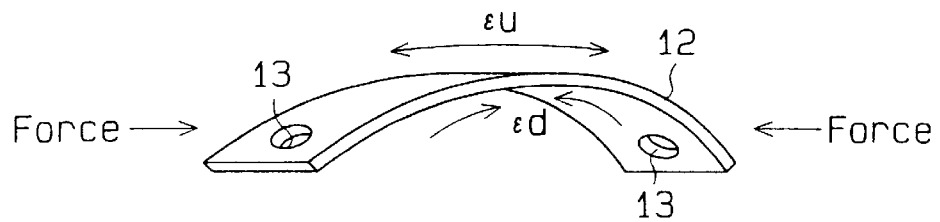

As shown in FIG. 4 (a), a shield plate 21 made of aluminum, iron or the like, may be provided on the surface of the core 12. This will allow further improved sensitivity during torque detection. For example, when torque is applied to the shaft 11 in a direction opposite to the arrow A, shown in FIGS. 1 and 2, a compressive force acts on the core 12. However, a microscopic view of the effects of the compressive force reveals that a compressive force acts on the lower surface of the core 12 while a tensile stress acts on the lower surface of the core 12, as shown shown in FIG. 4 (b). This is due to the core 12 being curved around the shaft 11. Strain resulting from the compressive force on the lower surface is represented by ∈d and strain resulting from the tensile force is represented by ∈n. The directions of the two strains are opposite to each other. Such phenomenon also takes place when torque in a direction towards the arrow A is applied. The values of the strain on both upper and lower surfaces are substantially the same (∈d≠∈u). However, the magnetic flux ø is greatly affected by strain caused by tensile stress acting on the lower surface in comparison with strain resulting from compressive force acting on the upper surface. That is, the relationship of ød>øu is satisfied. In this equation, ød represents the magnetic flux passing through the lower surface and øn represents the magnetic flux passing through the upper surface.

The induced electromotive force Vout existing at the detection coil 15 is expressed by the following equation, in which the induced electromotive force on the lower surface is represented by Voutd and the induced electromotive force on the upper surface is represented by Voutu:

$$Vout = Voutd + Voutu$$
$$= k \cdot Na \cdot \phi d \cdot \epsilon d - k \cdot Na \cdot \phi u \cdot \epsilon u$$

According to the above equation and conditions (∈d≠∈u, ød>øu), the induced electromotive force on the upper side Voutu (=−k·Na·øu·∈u) acting towards a direction opposite to the induced electromotive force Vout reduces sensitivity.

Figure 5:
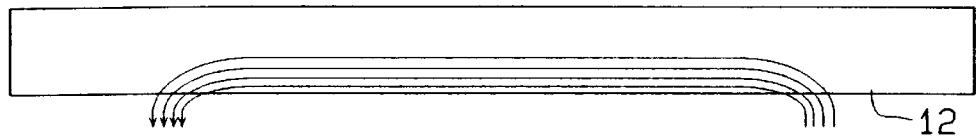
FIG. 5 is a diagrammatic view showing the magnetic flux distribution of the core.

By providing the shield plate 21 as shown in FIG. 4 (a), the plate 21 acts to reduce the magnetic flux øu which passes through the upper surface of the core 12 to a value that is substantially zero. FIG. 5 shows a diagrammatic view of the magnetic flux distribution in this case. Therefore, since the induced electromotive force Voutu on the upper side (=−k·Na·øu·∈u) is substantially zero, the sensitivity of the sensor is improved. Accordingly, the shield plate 21 enables torque to be detected with a further upgraded sensitivity.

The shield plate 21 may be arranged between the detection coil 15 and the exciting coil 16 on the upper surface side of the core 12. From the aspect of eddy current loss, aluminum is advantageous for the material of the shield plate 21 when the frequency of the current flowing through the exciting coil 16 is high.

Figure 6:
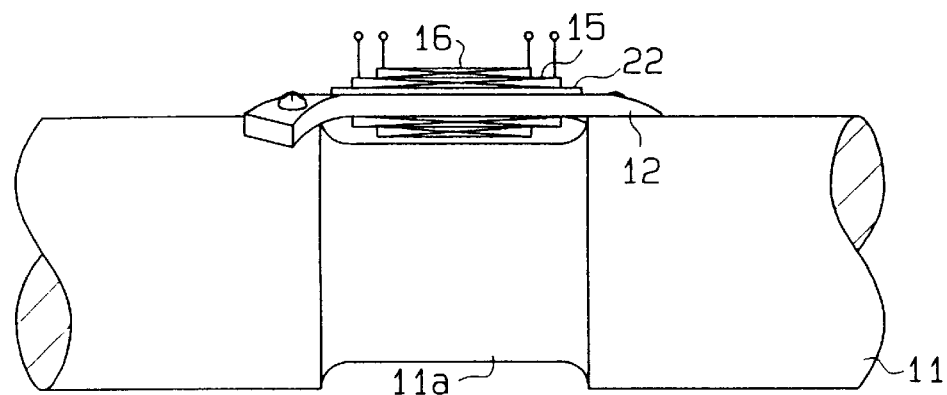
FIG. 6 is a front view showing another modification of the torque sensing and strain detecting device.
Figure 7:
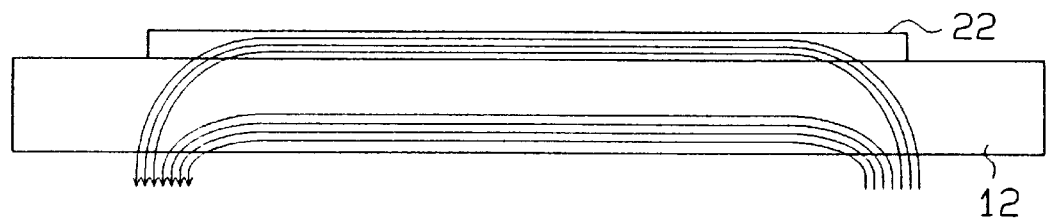
FIG. 7 is a diagrammatic view showing the magnetic flux distribution of the core.

As shown in FIG. 6, a plate-shaped magnetic material 22 made from, for example, silicon steel, soft magnetic stainless or the like, may be adhered to the surface of the core 12. This reduces the value of the magnetic flux øu which passes through the upper surface of the core 12 to a substantially zero value and thus upgrades sensitivity. As shown in FIG. 7, the provision of the magnetic material 22 prevents the magnetic flux øu from passing through the upper surface of the core 12. The magnetic flux øu passes through the magnetic material 22. As a result, the induced electromotive force on the upper side Voutu (=−k·Na·øu·∈u) becomes substantially zero and thus improves the sensitivity of the sensor. The requirements of the magnetic material 22 is to have a low magnetostriction ratio and a high permeability. For example, permalloy, which is a magnetostrictive material, may be utilizes if theses requirements are satisfied.

Figure 8:
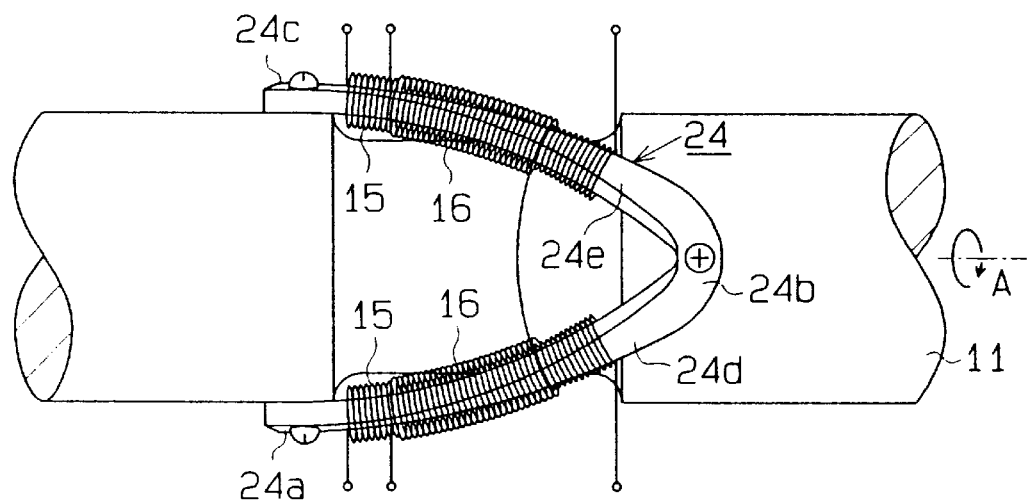
FIGS. 8 through 14 are plan views showing different modifications of the torque sensing and strain detecting device.

As shown in FIG. 8, the core 24 may be substantially V-shaped, providing a pair of elongated and integral core sections 24d, 24e, which are angularly disposed oppositely and symmetrically with respect to the longitudinal axis of the shaft 11. In this core 24, fastening sections 24a, 24b and 24c are defined at the basal side, which is located in the middle of the core 24, and the two ends at the distal side. The fastening sections 24a, 24b, 24c are secured to the shaft 11 by the screws 14. First and second main sections 24d, 24e are arranged along a direction inclined 45 degrees with respect to the center axis of the shaft 11 and extend in opposite directions. The detection coil 15 and the exciting coil 16 are wound about each main section 24d, 24e. The exciting coil 16 is arranged in a manner that the two fastening sections 24a, 24c are magnetized having different magnetic poles.

This modification will also enable the meritorious effects of the above embodiment to be obtained. In this case, tensile stress will cause strain at the first main section 24d and compressive force will cause strain at the second main section 24e when torque is applied in the direction indicated by the arrow A.

Figure 18:
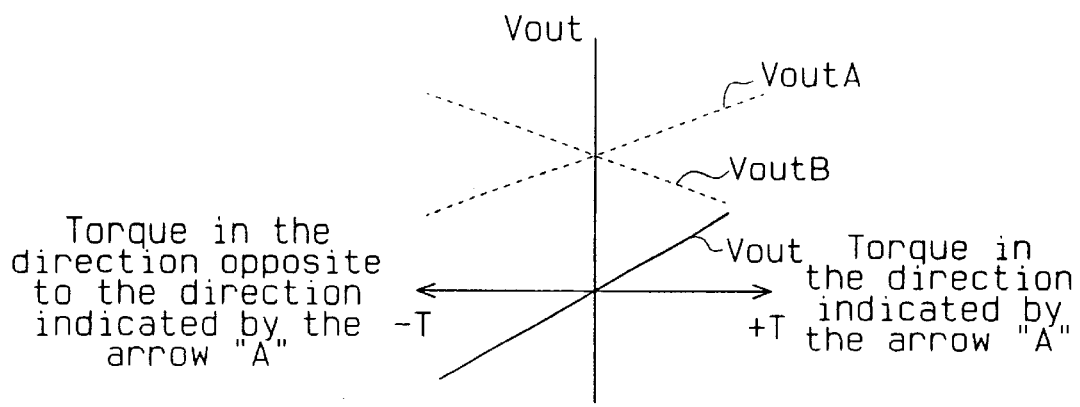

The induced electromotive force VoutA of the detection coil 15 wound about the first main section 24d of the core 24 and the induced electromotive force VoutB of the detection coil 15 wound about the second main section 24e are shown in the broken lines in FIG. 18 with respect to the torque T. The induced electromotive force Vout is shown in the solid line with respect to the torque T. The induced electromotive force Vout is obtained through a subtracting process of the induced electromotive forces VoutA and VoutB executed in a differential circuit. By performing this process in the differential circuit, external noise cause by temperature changes is offset. This ensures the value of the detected torque. Thus, a further upgraded high-precision detection of the torque is possible. The values indicated along the vertical axis of the diagram shown in FIG. 18 are direct current values of the induced electromotive force after being rectified in the rectifying circuit.

Figure 9:
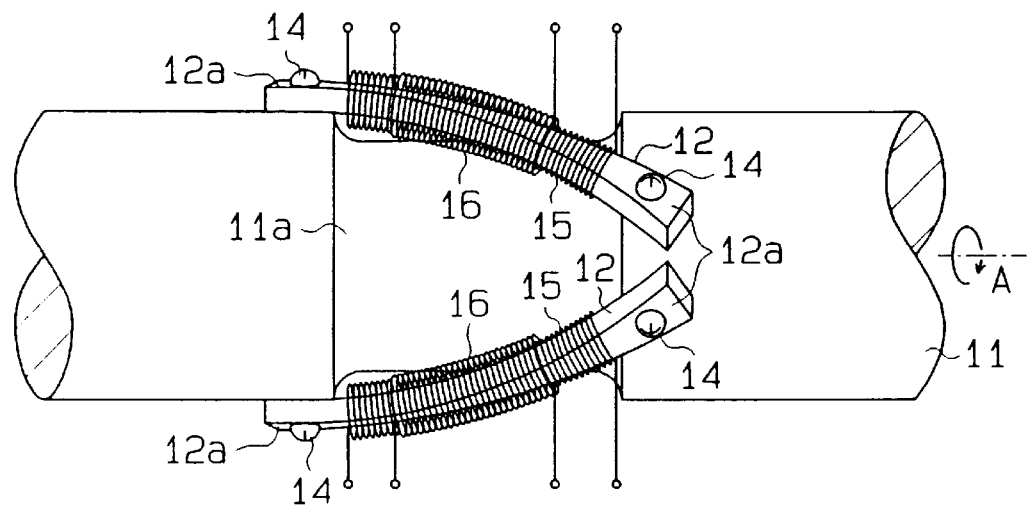

Another modification shown in FIG. 9 utilizes two of the cores 12 described in the above embodiment. Each elongated core 12 is angularly disposed oppositely and symmetrically with respect to each other and to the longitudinal center axis of the shaft 11. In this case, the meritorious effects obtained are similar to the effects of the torque sensing and strain detecting device shown in FIG. 8. The shield plate 21 or the magnetic material 22 may be provided on the surfaces of the cores 24, 12 shown in FIGS. 8 and 9. This will further improve the accuracy of the torque sensing and strain detecting device.

Figure 10:
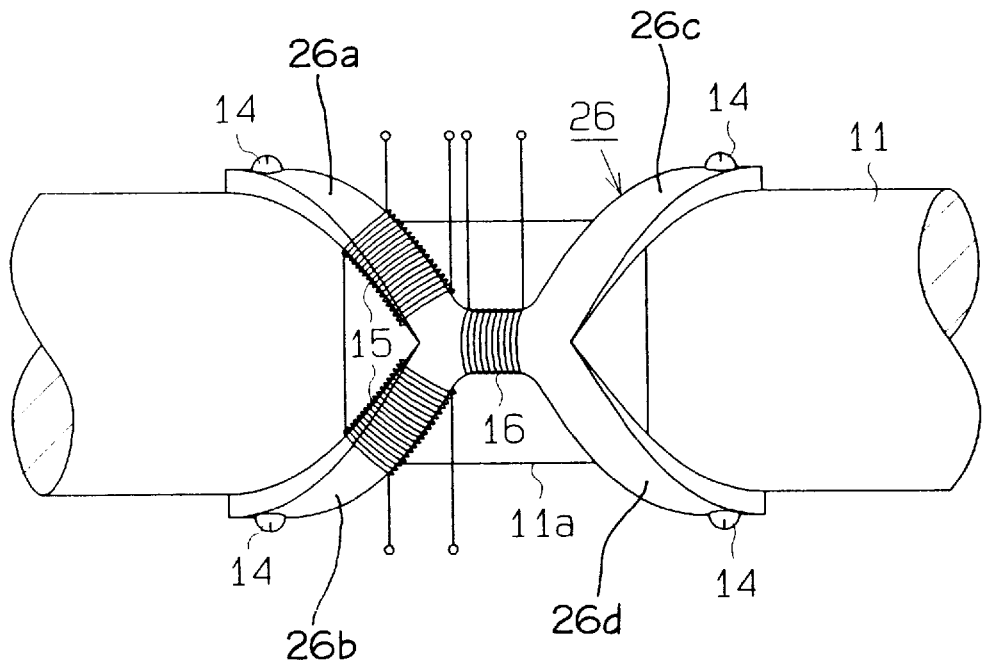

As shown in FIG. 10, an integral X-shaped core 26, providing oppositely facing and centrally intersecting V-shaped core portions, respectively providing pairs of oppositely and symmetrically angularly disposed and integral core sections 26a, 26b and 26c, 26d, may be employed. The meritorious effects obtained in this modification are similar to the effects of the torque sensing and strain detecting devices shown in FIGS. 8 and 9. The shield plate 21 or the magnetic material 22 may be provided on the surface of the core 26 in this embodiment as well.

Figure 11:
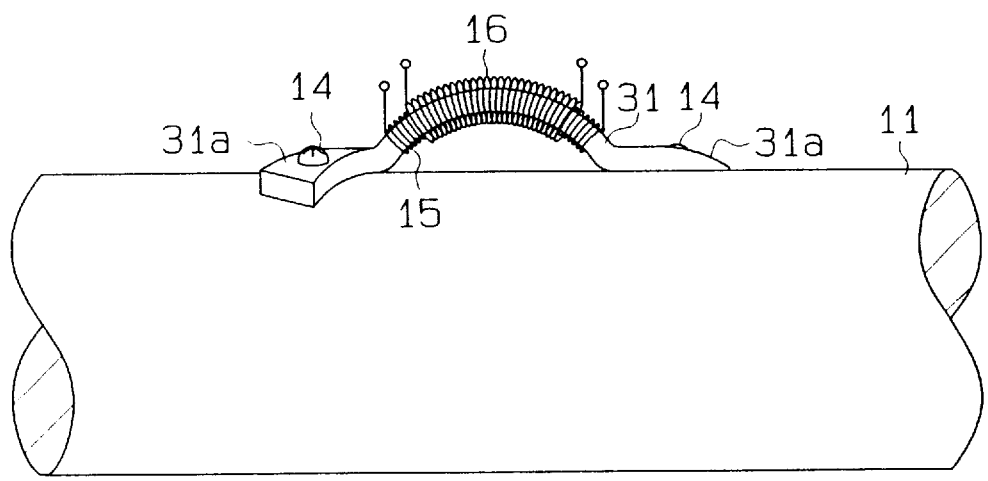
Figure 12:
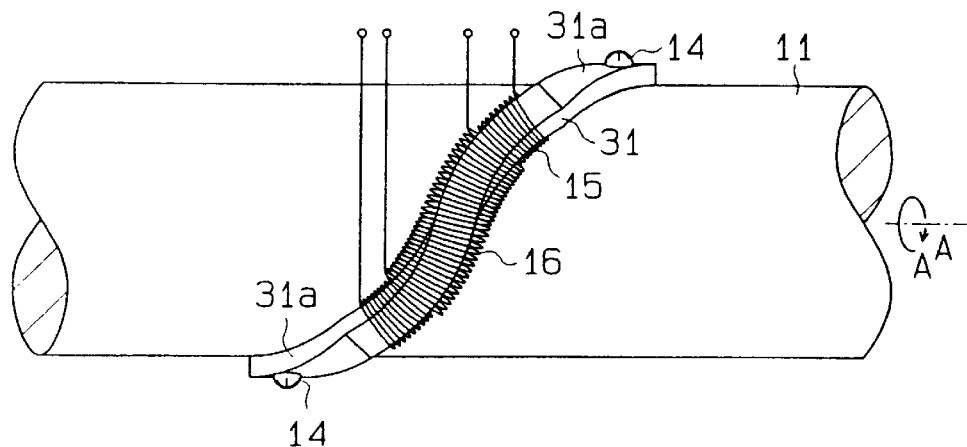

Another modification shown in FIGS. 11 and 12 utilizes an arc-like core 31. The core 31 is secured to the shaft 11 at fastening sections 31a defined at each end by screws 14. The portion between both fastening sections 31a is curved away from the shaft 11 in an arc-like manner. The detection coil 15 and the exciting coil 16 are wound around the curved section. In this modification, regardless of whether the groove 11a is provided in the shaft 11, the coils 15, 16 do not interfere with the surface of the shaft 11. Thus, this sensor may be assembled to the shaft 11 regardless of the shape of the shaft 11.

Figure 13:
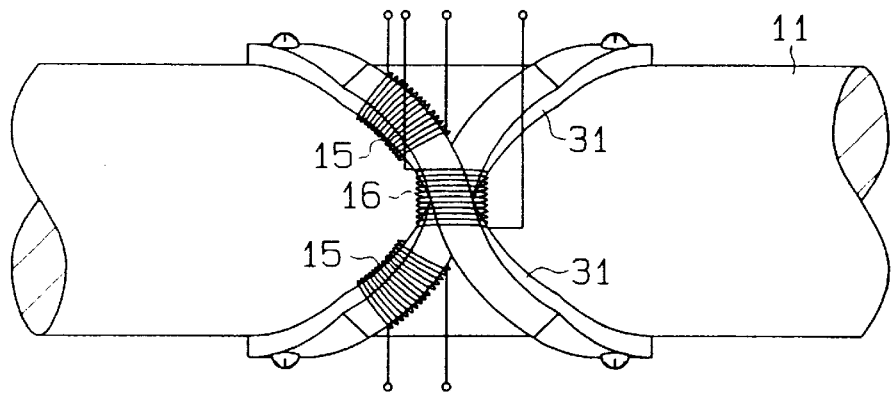

Another modification shown in FIG. 13 fastens two of the arc-like cores 31 to the shaft 11 in a manner that one of the cores 31 extends crossing over the other core 31. The exciting coil 16 is wound about both cores 31 at the crossing section. The meritorious effects obtained in this modification are similar to the effects of the torque sensing and strain detecting devices shown in FIGS. 8 and 9.

Figure 14:
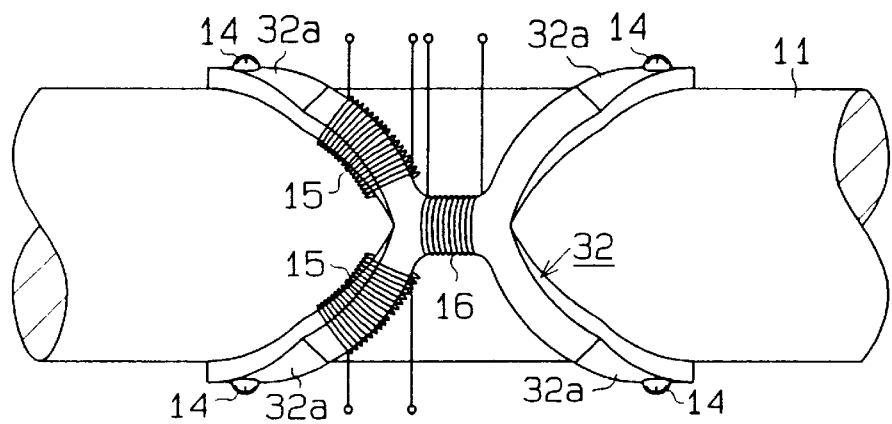

As shown in FIG. 14, an X-shaped core 32 may be utilizes. In this case, a fastening section 32a is defined at each of the four ends of the core 32. The core 32 is curved away from the shaft 11 at the portions between the fastening sections 32a. The detection coil 15 is wound around two of the curved sections. The exciting coil 16 is wound around the middle section of the core 32. This structure allows the sensors to be mounted on the shaft 11 without limitations caused by the shape of the shaft 11. In addition, the meritorious effects obtained in the torque sensing and strain detecting devices of FIGS. 8 and 9 are also obtained in this modification. The shield plate 21 or the magnetic material 22 may also be provided on the surface of the core 32 in this case.

Figure 15:
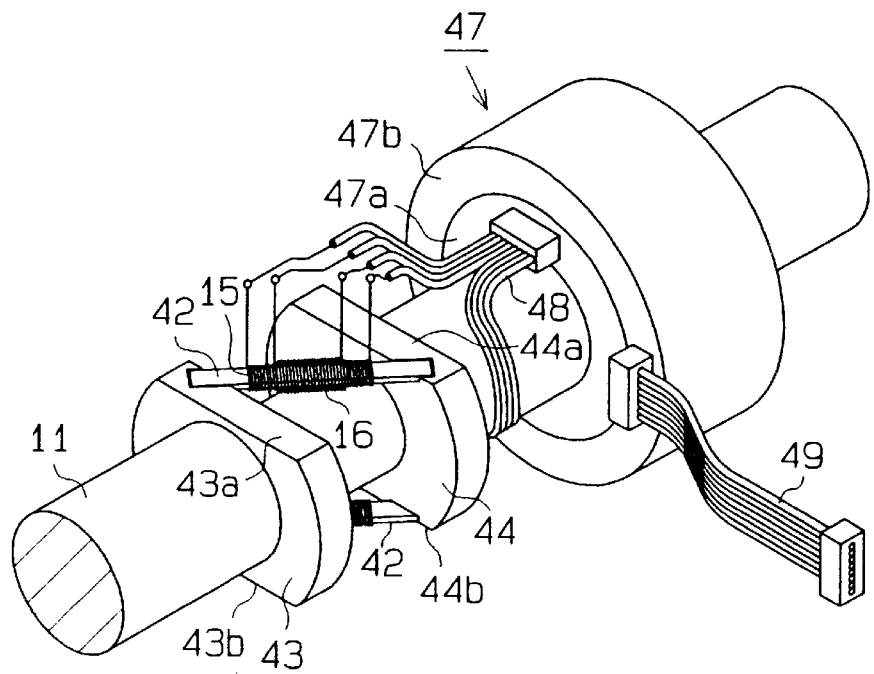
FIGS. 15 and 16 are perspective views showing different modifications of the torque sensing and strain detecting device.
Figure 16:
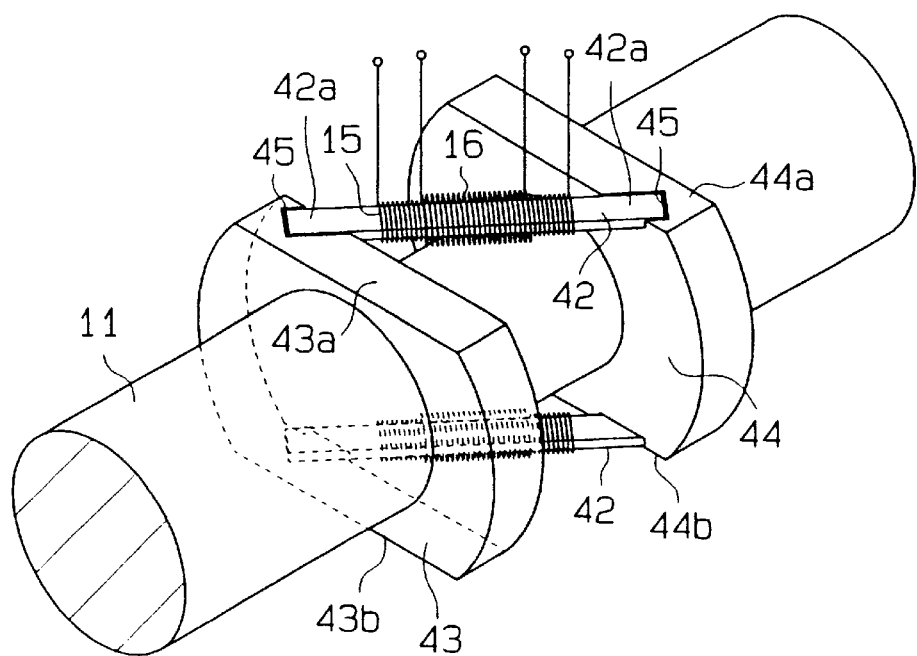

A plate-shape core 42 shown in FIGS. 15 and 16 may be utilized. In this modification, fastening sections 42a are defined at each end of the core 42. The detection coil 15 and the exciting coil 16 are wound around the core 42 between the two fastening sections 42a. The shaft 11 is made of carburized steel or induction hardened steel. A pair of flanges 43, 44 are provided on the shaft 11 with a predetermined space in between. Flat platforms 43a 44a and 43b, 44b are formed on the flanges 43, 44 along two planes which are parallel to the center axis of the shaft 11. Accordingly, platforms 43b, 44b are separated from the platforms 43a, 44a at an angle of 180 degrees.

The core 42 is provided between each pair of platforms 43a, 44a and 43b, 44b along a direction inclined with respect to the center axis of the shaft 11. The inclined direction of both cores 42 are the same.

A groove 45 is formed in each platform 43a, 44a, 43b, 44b. The fastening sections 42a of the cores 42 are fitted into the grooves 45. In this fitted state, the fastening sections 42a are fitted to each associated platform 43a, 44a, 43b, 44b through beam welding using a laser, an electron beam or the like. The cores 42 may also be secured using spot welding, resistance welding, Tungsten inert gas (TIG) welding, metal inert gas (MIG) welding or the like. The cores 42 may also be secured through brazing or crimping, or by using fasteners.

A spiral unit 47 is provided on the shaft 11 shown in FIG. 15. The unit 47 includes a fixed section 47b, which is fixed to a frame (not shown), and a rotating section 47a, which is relatively rotatable with respect to the shaft 11 and the fixed section 47b. The detection coil 15 and the exciting coil 16 are connected to a harness 48 provided on the rotating section 47a. The processor 19 (refer to FIG. 1) is connected to a harness 49 provided on the fixed section 47b. The spiral unit 47 incorporates a reel, which winds or unwinds the harness 48 during relative rotation between the shaft 11 and the rotating section 47a. The reel also tolerates rotation of the shaft 11.

Therefore, the torque sensing and strain detecting device of this modification has output characteristics found in the embodiments and modifications described above. Such characteristics include high-power and superior linearity. Since the cores 42 are fixed to the flanges 43, 44 projecting from the shaft 11, the strength of the shaft 11 is not reduced. In addition, a reduction in the strength of the shaft 11 due to welding is prevented by the flanges 43, 44.

Furthermore, the flat plate-shaped cores 42 have the following superior effects:

(1) Diversity in the spring back, which occurs after being pressed, and the difference in the internal stress caused during magnetic annealing is small between each core 42. This point differs from the above cores.

(2) The handling of the core 42 is simple. For example, the winding of the detection coil 15 and the exciting coil 16 is simplified. If the coils 15, 16 are preshaped in a bobbin-like manner, the core 42 may simply be inserted into the coils 15, 16.

(3) During welding of the cores 42, the fastening sections 42a are positioned easily. This allows fewer to be made during mounting of the cores 42.

(4) Since the magnetic anisotropy of the core 42 is based on its shape, in comparison with the curved cores in the above modifications, the output characteristics of the sensor may easily be adjusted by simply changing the length of the core 42.

In this modification, a core 42 is arranged between each pair of platforms 43a, 44a and 43b, 44b. However, the core 42 may be provided on only one of the pairs. Instead of fitting the core 42 into the groove 45, the core 42 may be fixed directly to the surface of the associated platforms 43a, 44a, 43b, 44b. This will allow the grooves 45 to be omitted. The plate shaped core 42 may be changed to a prism shaped core. This will enable the same meritorious effects to be obtained.

The cores 12, 24, 26, 31, 32, 42, shown in FIGS. 1 through 16, each wound by the detection coil 15 and the exciting coil 16, are utilized to detect torque applied to the steering shaft 11. However, the cores may be utilized on other types of rotary shafts, such as the shaft of a torque wrench or the shaft of various types of devices, to detect the torque applied on the shaft.

The cores 12, 24, 26, 31, 32, 42 may be utilized as a strain detecting element that detects properties other than torque such as thrust load. This will enable the same merits described above to be obtained.

The cores 12, 24, 26, 31, 32, 42 are wound by the detection coil 15 and the exciting coil 16. However, the cores may be used with only the exciting coil 16. In this case, the alteration in the magnetic characteristics caused by strain acting in the cores 12, 24, 26, 31, 32, 42 is detected by the alteration in the current flowing through the exciting coil 16 or the alteration of the voltage between the terminals of the coil 16. In such cases, torque is detected according to the alteration of current or voltage.

The cores 12, 24, 26, 31, 32, 42 are arranged along a direction inclined at an angle of 45 degrees with respect to the axis of the shaft 11. However, the inclination may be changed to an arbitrary angle including a zero angle, that is, the core may be parallel to the shaft axis. When the core is arranged parallel to the shaft axis, the direction of the applied torque may not be distinguished. However, cores arranged in such manner are advantageous when detecting torque constantly applied in the same direction since it may easily be mounted on a shaft.

The frequency of the current that flows through the exciting coil 16 may be altered to an appropriate value according to its requirements. For example, the frequency of the current may be in the range between 10 KHz to 10 MHz to achieve the effects described above. The current may be a direct current instead of an alternating current.

Although the cores 12, 24, 26, 31, 32 are secured to the shaft 11 by screws 14, they may be secured by other methods such as welding.

Therefore, the present examples and embodiments are to be considered as illustrative and not restrictive and the invention is not to be limited to the details given herein, but may be modified within he scope of the appended claims.

What is claimed is:

1. A torque sensing and strain detecting device on a rotary shaft for detecting torque applied to said shaft, said torque sensing and strain detecting device comprising:

an elongated magnetostrictive core having at least a pair of spaced apart fastening sections respectively attached to said shaft and mounting the magnetostrictive core on the rotary shaft whereby the elongated magnetostrictive core extends angularly with respect to the longitudinal axis of the rotary shaft; and coil means comprising an exciting coil wound annularly around and along the magnetostrictive core between the fastening sections, said magnetostrictive core between its fastening sections and said coil means being out of contact with said rotary shaft, whereby torque applied to said shaft is detectable in response to an electromotive force induced in said coil means by strain in said magnetostrictive core resulting from said application of torque to the rotary shaft.

2. The torque sensing and strain detecting device according to claim 1, wherein said coil means further comprises a detection coil wound annularly around and along the magnetostrictive core between its said fastening sections for detecting the induced electromotive force.

3. The torque sensing and strain detecting device according to claim 2, wherein said elongated magnetostrictive core is angularly disposed in the direction of its elongation with respect to the longitudinal axis of the rotary shaft.

4. The torque sensing and strain detecting device according to claim 3, wherein said elongated magnetostrictive core includes a pair of elongated magnetostrictive core sections which are disposed angularly and symmetrically with respect to each other in the directions of their elongations and to the axis of the rotary shaft.

5. The torque sensing and strain detecting device according to claim 3, wherein said elongated magnetostrictive core includes a pair of elongated magnetostrictive cores in angular crossing relation with respect to each other on said rotary shaft.

6. The torque sensing and strain detecting device according to claim 2, wherein said rotary shaft has a groove extending along its outer periphery, and wherein said magnetostrictive core extends over said groove, and a portion of said exciting coil and a portion of said detection coil are located within the length of said groove.

7. The torque sensing and strain detecting device according to claim 1 which further comprises a shield plate on said magnetostrictive core for shielding an external surface of the magnetostrictive core from magnetic flux.

8. The torque sensing and strain detecting device according to claim 1, wherein said magnetostrictive core has a magnetic substance thereon for conducting magnetic flux and thereby suppressing magnetic flux passage through an external surface of the magnetostrictive core.

9. The torque sensing and strain detecting device according to claim 1, wherein said magnetostrictive core has an arcuately curved section of its length between said magnetostrictive core fastening sections, said arcuate section arching away from said shaft, and wherein said coil means is wound around said curved section.

10. The torque sensing and strain detecting device according to claim 2, wherein said rotary shaft has a pair of flanges separated from each other by a predetermined distance along the shaft, each flange supporting one of said magnetostrictive core fastening sections, and said magnetostrictive core being straight, such that said magnetostrictive core is located in a plane extending parallel to the axis of the rotary shaft.

11. The torque sensing and strain detecting device according to claim 10, wherein each said flange has a recess for accommodating the associated fastening section of said magnetostrictive core.

12. The torque sensing and strain detecting device according to claim 1, wherein said rotary shaft is part of a steering column of an automobile.

13. A torque sensing and strain detecting device comprising an elongated magnetostrictive core for detecting strain induced in a mechanical element by torque applied thereto:

at least a pair of spaced apart fastening sections of said magnetostrictive core mounting the magnetostrictive core on said element in angular relation to the direction of torque;

coil means wound annularly around and along the magnetostrictive core between its said fastening sections, said magnetostrictive core between its said fastening sections and said coil means wound therearound being out of contact with said mechanical element, whereby torque applied to said mechanical element is detectable in response to an electromotive force induced in said coil means by strain in said magnetostrictive core resulting from said application of torque to the element.

14. The torque sensing and strain detecting device according to claim 13, wherein said coil means includes an exciting coil for exciting the magnetostrictive core and a detection coil for detecting said induced electromotive force.

15. The torque sensing and strain detecting device according to claim 14, wherein said magnetostrictive core is formed in a V-shape and has three fastening sections fixed on said element, two of said fastening sections being adjacent to one another, and wherein said exciting coil and said detecting coil are wound annularly around the outer periphery of said magnetostrictive core between said adjacent fastening sections.

16. The torque sensing and strain detecting device according to claim 15, wherein said magnetostrictive core is curved between said fastening sections.

17. The torque sensing and strain detecting device according to claim 13, which further comprises a shield plate on said magnetostrictive core for shielding an external surface of the core from magnetic flux.

18. The torque sensing and strain detecting device according to claim 13, wherein said magnetostrictive core has a magnetic substance thereon for conducting magnetic flux and thereby suppressing magnetic flux passage through an external surface of the magnetostrictive core.

* * * * *

UNITED STATES PATENT AND TRADEMARK OFFICE
CERTIFICATE OF CORRECTION

PATENT NO. : 5,831,180

DATED : November 3, 1998

INVENTOR(S) : Katsufumi Tanaka, et al.

It is certified that error appears in the above-identified patent and that said Letters Patent is hereby corrected as shown below:

Column 1, line 44, after the phrase "a detecting coil" and before the word "and", delete ",".

Column 2, line 7, change "coat" to --cost--.

Column 4, line 35, change "ørepresents" to --ø represents--.

Column 4, line 36, after the word "flux" and before the symbol " ", insert --,--.

after the word "strain" and before the word "and", delete ",".

Column 5, line 17, after the word "its" and before the word "fastening", insert --two--.

Column 6, line 1, change "n" to --u--.

Column 6, line 6, change "øis" to --ø is--.

Column 6, line 11, change "øn" to --øu--.

UNITED STATES PATENT AND TRADEMARK OFFICE
CERTIFICATE OF CORRECTION

PATENT NO. : 5,831,180

DATED : November 3, 1998

INVENTOR(S) : Katsufumi Tanaka, et al.

It is certified that error appears in the above-identified patent and that said Letters Patent is hereby corrected as shown below:

Column 6, line 56, change "utilizes" to --utilized--.

change "theses" to --these--.

Column 7, line 22, change "cause" to --caused--.

Column 8, line 2, change "utilizes" to --utilized--.

Column 8, line 8, change "sensors" to --sensor--.

Column 9, line 18, change "prism shaped" to --prism-shaped--.

Column 9, line 63, change "he" to --the--.

In the Claims:

Column 10, line 10: change "its fastening" to --its said fastening--.

Signed and Sealed this

Eighth Day of June, 1999

*Attest:*

Q. TODD DICKINSON

*Attesting Officer*     *Acting Commissioner of Patents and Trademarks*